(12) United States Patent
Brannon et al.

(10) Patent No.: US 8,127,850 B2
(45) Date of Patent: *Mar. 6, 2012

(54) METHOD OF TREATING SUBTERRANEAN FORMATIONS USING SEQUENTIAL PROPPANT STAGES

(75) Inventors: Harold Dean Brannon, Magnolia, TX (US); William Dale Wood, Spring, TX (US); Randall Edgeman, Midland, TX (US); Allan Ray Rickards, Tomball, TX (US); Christopher John Stephenson, Houston, TX (US); Doug Walser, Midland, TX (US); Mark Malone, Midland, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/079,636

(22) Filed: Apr. 4, 2011

(65) Prior Publication Data
US 2011/0180260 A1  Jul. 28, 2011

Related U.S. Application Data

(63) Continuation of application No. 12/347,671, filed on Dec. 31, 2008, now Pat. No. 7,918,277, which is a continuation of application No. 11/708,597, filed on Feb. 20, 2007, now Pat. No. 7,472,751, which is a continuation of application No. 10/803,258, filed on Mar. 18, 2004, now Pat. No. 7,210,528.

(60) Provisional application No. 60/455,717, filed on Mar. 18, 2003, provisional application No. 60/508,822, filed on Oct. 3, 2003.

(51) Int. Cl.
*E21B 43/267* (2006.01)
(52) U.S. Cl. .................................. 166/308.1; 166/280.1
(58) Field of Classification Search ........................ None
See application file for complete search history.

(56) References Cited

U.S. PATENT DOCUMENTS

| 7,210,528 B1 * | 5/2007 | Brannon et al. | ............... 507/140 |
| 7,472,751 B2 * | 1/2009 | Brannon et al. | ........... 166/280.1 |
| 7,918,277 B2 * | 4/2011 | Brannon et al. | ........... 166/280.2 |

* cited by examiner

*Primary Examiner* — Angela M DiTrani
(74) *Attorney, Agent, or Firm* — John Wilson Jones; Jones & Smith, LLP

(57) ABSTRACT

An increase in effective propped lengths is evidenced in hydraulic fracturing treatments by the use of ultra lightweight (ULW) proppants. The ULW proppants have a density less than or equal to 2.45 g/cc and may be used as a mixture in a first proppant stage wherein at least one of the proppants is a ULW proppant. Alternatively, sequential proppant stages may be introduced into the formation wherein at least one of the proppant stages contain a ULW proppant and where at least one of the following conditions prevails:
  (i.) the density differential between the first proppant stage and the second proppant stage is greater than or equal to 0.2 g/cc;
  (ii.) both the first proppant stage and the second proppant stage contain a ULW proppant;
  (iii.) the rate of injection of the second proppant stage into the fracture is different from the rate of injection of the first proppant stage; or
  (iv.) the particle size of the second proppant stage is different from the particle size of the first proppant stage.

22 Claims, 2 Drawing Sheets

METHOD OF TREATING SUBTERRANEAN FORMATIONS USING SEQUENTIAL PROPPANT STAGES

This application is a continuation application of U.S. application Ser. No. 12/347,671, filed on Dec. 31, 2008, now U.S. Pat. No. 7,918,277, which is a continuation application of U.S. patent application Ser. No. 11/708,597, filed on Feb. 20, 2007, now U.S. Pat. No. 7,472,751, which is a continuation application of U.S. patent application Ser. No. 10/803,258 filed on Mar. 18, 2004, now U.S. Pat. No. 7,210,528, which are herein incorporated by reference. U.S. Pat. No. 7,210,528 claims the benefit of U.S. application Ser. Nos. 60/455,717, filed on Mar. 18, 2003 and 60/508,822, filed Oct. 3, 2003.

FIELD OF THE INVENTION

This invention relates to a method of treating subterranean formations and, more specifically, to hydraulic fracturing treatments for subterranean formations. Use of the method of the invention renders an increase in effective propped lengths by as much as 100%. Thus, the inventive method increases well productivity, greatly enhances reservoir drainage, and improves hydrocarbon recovery.

BACKGROUND OF THE INVENTION

Hydraulic fracturing is a common stimulation technique used to enhance production of fluids from subterranean formations. Hydraulic fracturing is typically employed to stimulate wells which produce from low permeability formations. In such wells, recovery efficiency is typically limited by the flow mechanisms associated with a low permeability formation.

During hydraulic fracturing, a viscosified fracturing fluid is pumped at high pressures and at high rates into a wellbore to initiate and propagate a hydraulic fracture. Once the natural reservoir pressures are exceeded, the fluid induces a fracture in the formation and transports the proppant into the fracture. The fluid used to initiate and propagate the fracture is commonly known as the "pad". The pad may contain a heavy density fine particulate, such as fine mesh sand, for fluid loss control, or larger grain sand to abrade perforations or near-wellbore tortuosity. Once the fracture is initiated, subsequent stages of viscosified fracturing fluid containing chemical agents such as breakers, and containing proppants are pumped into the created fracture. The fracture generally continues to grow during pumping and the proppant remains in the fracture in the form of a permeable "pack" that serves to "prop" the fracture open. Once the treatment is completed, the fracture closes onto the proppants which maintain the fracture open, providing a highly conductive pathway for hydrocarbons and/or other formation fluids to flow into the wellbore. The fracturing fluid ultimately "leaks off" into the surrounding formation. The treatment design generally requires the fracturing fluid to reach maximum viscosity as it enters the fracture which affects the fracture length and width.

Fracturing fluids, including those containing breakers, typically exhibit poor transport properties. High pumping rates are required in order to impart a sufficient velocity for placement of the proppant in the fracture. In such treatments, the proppant tends to settle, forming a 'proppant bank', as the linear slurry velocity falls as a function of the distance from the wellbore. This effect is further believed to result in reduced stimulation efficiency as the effective propped length is relatively short. In addition, much of the settled proppant is often below the productive interval.

The recovery of the fracturing fluid is accomplished by reducing the viscosity of the fluid to a low value such that it flows naturally from the formation under the influence of formation fluids and pressure. This viscosity reduction or conversion is referred to as "breaking". Historically, the application of breaking fluids as fracturing fluids at elevated temperatures, i.e., above about 120-130° F., has been a compromise between maintaining proppant transport and achieving the desired fracture conductivity, measured in terms of effective propped fracture length. Conventional oxidative breakers react rapidly at elevated temperatures, potentially leading to catastrophic loss of proppant transport. Encapsulated oxidative breakers have experienced limited utility at elevated temperatures due to a tendency to release prematurely or to have been rendered ineffective through payload self-degradation prior to release.

Improvements in hydraulic fracturing techniques are required in order to increase the effective propped fracture length and thereby improve stimulation efficiency and well productivity.

SUMMARY OF THE INVENTION

The invention relates to a method of hydraulically fracturing a hydrocarbon-bearing subterranean formation by introducing into the formation one or more proppant stages wherein at least one of the proppant stages contains an ultra lightweight (ULW) proppant having a density less than or equal to 2.45 g/cc. The method results in an increase in the effective propped fracture length. The first proppant stage may consist of a mixture of proppants, at least one of which is an ULW proppant having a density less than or equal to 2.45 g/cc. Alternatively, sequential proppant stages may be introduced into the formation wherein at least one of the proppant stages contains a ULW proppant.

The first proppant stage may be a pad fluid, containing a proppant, and pumped at a pressure sufficient to initiate a fracture. Alternatively, the first proppant stage may be pumped into a propagated fracture. As such, the first proppant stage of the invention may be introduced into the fracture subsequent to propagation of the fracture. An optional second proppant stage may be injected into the fracture after introduction of the first proppant stage. Successive proppant stages may be injected into the fracture after injection of the optional second proppant stage. The second proppant stage may be introduced into the formation immediately after the first proppant stage.

Thus, in the method of the invention, at least one of the following conditions should prevail:

(i.) the first proppant stage contains a mixture of proppants—for example, a first proppant and a second proppant—wherein at least one of the proppants is a ULW; preferably, the density differential between the ULW proppant and the second proppant in the proppant mixture is greater than or equal to 0.2 g/cc. For instance, the first proppant stage may contain a mixture of two proppants comprising a ULW proppant and a non-ULW proppant. In such proppant mixtures, the differential in the density between the two proppants is preferably greater than 0.2 g/cc. Alternatively, where the invention encompasses two or more proppant stages, all or some of the proppant stages may contain a mixture of proppants, wherein within each proppant stage, at least one of the proppants is a ULW proppant. In each proppant stage, the density of the ULW proppant within the mixture is preferably greater than or equal to 0.2 g/cc the density of a second proppant within the mixture;

(ii.) the density differential between the first proppant stage and the second proppant stage is greater than or equal to 0.2 g/cc;

(iii.) the first proppant stage and the second proppant stage both contain ULW proppants;

(iv.) the proppant of the first proppant stage and/or the second proppant stage is a ULW and the rate of injection of the second proppant stage into the fracture is different from the rate of injection of the first proppant stage; in a preferred mode, the rate of injection of the second proppant stage is less than the rate of injection of the first proppant stage; or (v.) the proppant of the first proppant stage and/or the second proppant stage contains a ULW proppant and the particle size of the second proppant stage is different from the particle size of the first proppant stage; in a preferred mode, the particle size of the second proppant stage is preferably larger than the particle size of the proppant of the first proppant stage when the second proppant stage is directed more towards the wellbore. The particle size of the second proppant stage is preferably smaller than the particle size of the proppant of the first proppant stage when the second proppant stage is directed further into the fracture.

The effective propped length of the fracture after injection of any given proppant stage is preferably greater than the effective propped length of the proppant stage introduced into the fracture just prior to the injection of the any given proppant stage.

In a preferred embodiment, the first proppant stage comprises a first proppant and a second proppant, wherein the first proppant is a relatively high-density proppant, i.e., having a density greater than 2.45 g/cc, such as sand, ceramic, sintered bauxite or resin coated proppant, and the second proppant is a ULW proppant. A subsequent second proppant stage may include an ultra-lightweight proppant, exhibiting a particle density substantially lower than the density of the relatively high-density proppant. For instance, the proppant of the subsequent proppant stage has a density less than or equal to 2.45 g/cc, preferably ranging between from about 1.25 g/cc to about 1.75 g/cc.

Additional proppant stages may be introduced into the formation after introduction of the second proppant stage. Such additional proppant stages will be referred to herein as the "ultimate proppant stage" and the "penultimate proppant stage" to refer to the latter and next to latter proppant stages, respectively. For example, where three proppant stages are employed and when referring to the third and second proppant stages, the third proppant stage may be referred to as the "ultimate proppant stage" and the second proppant stage as the "penultimate proppant stage." Where four proppant stages are employed and when referring to the fourth and third proppant stages, the fourth proppant stage may be referred to as the "ultimate proppant stage" and the third proppant stage may be referred to as the "penultimate proppant stage," etc. The ultimate proppant stage may be introduced into the formation immediately after the penultimate proppant stage. At least one of the following conditions preferably prevails:

(i.) the density differential between the ultimate proppant stage and the penultimate proppant stage is greater than or equal to 0.2 g/cc; for instance, when referring to the third and second proppant stages, the density differential between the third proppant stage and the second stage is greater than or equal to 0.2 g/cc;

(ii.) the rate of injection of the ultimate proppant stage into the fracture is different from the rate of injection of the penultimate proppant stage; typically, the rate of injection of the ultimate proppant stage into the fracture is lower than the rate of injection of the penultimate proppant stage into the fracture; or (iii.) the particle size of the ultimate proppant stage is different from the particle size of the penultimate proppant stage; typically, the particle size of the proppant of the ultimate proppant stage into the fracture is dependent on whether the proppant stage is directed more towards the wellbore (generally larger) or further into the fracture (generally smaller).

In a preferred embodiment, the first proppant stage comprises a first proppant and a second proppant, wherein the first proppant is a relatively high-density proppant, such as sand, ceramic, sintered bauxite or resin coated proppant, and the second proppant has a density less than or equal to 2.45 g/cc.

Alternatively, a fracture may be created in the formation by injecting a banking fluid containing a first proppant stage into the formation at a pressure sufficient to allow the formation of a proppant bank A second proppant stage is then injected into the fracture. The proppant of either the first proppant stage or the second proppant stage or both may contain a ULW proppant. In a preferred embodiment, the density differential between the proppant of the first proppant stage (the banking fluid) and the proppant of the second proppant stage is at least 0.2 g/cc.

Alternatively, a fluid containing a relatively high-density proppant may be used to propagate the fracture, allowing it to form the bank. The subsequent second proppant stage may include an ultra-lightweight proppant, exhibiting a particle density substantially lower than the density of the relatively high-density proppant. For instance, the proppant of the subsequent proppant stage may have a density ranging between from about 1.25 g/cc to about 1.75 g/cc.

The invention further has particular applicability in the use of a ULW proppant in a pad fluid to initiate a fracture in the formation. The second proppant stage introduced into the fracture may contain a ULW proppant or a proppant of higher density, such as, for example, sand, ceramic, bauxite, or resin coated proppant. The density differential between the first proppant stage, or pad fluid, and second proppant stage is preferably at least 0.2 g/cc.

The method of incorporating two or more proppant stages under the defined conditions, or using two or more mixed proppants in a single proppant stage, having a ULW proppant provides significant benefits relative to treatments with conventional high-density proppants. In addition, the method provides significant benefits as compared to prior art methods. Such benefits include a reduction in costs and the potential for significantly improved effective propped fracture length.

DETAILED DESCRIPTION OF THE PREFERRED EMBODIMENTS

Figure 1:
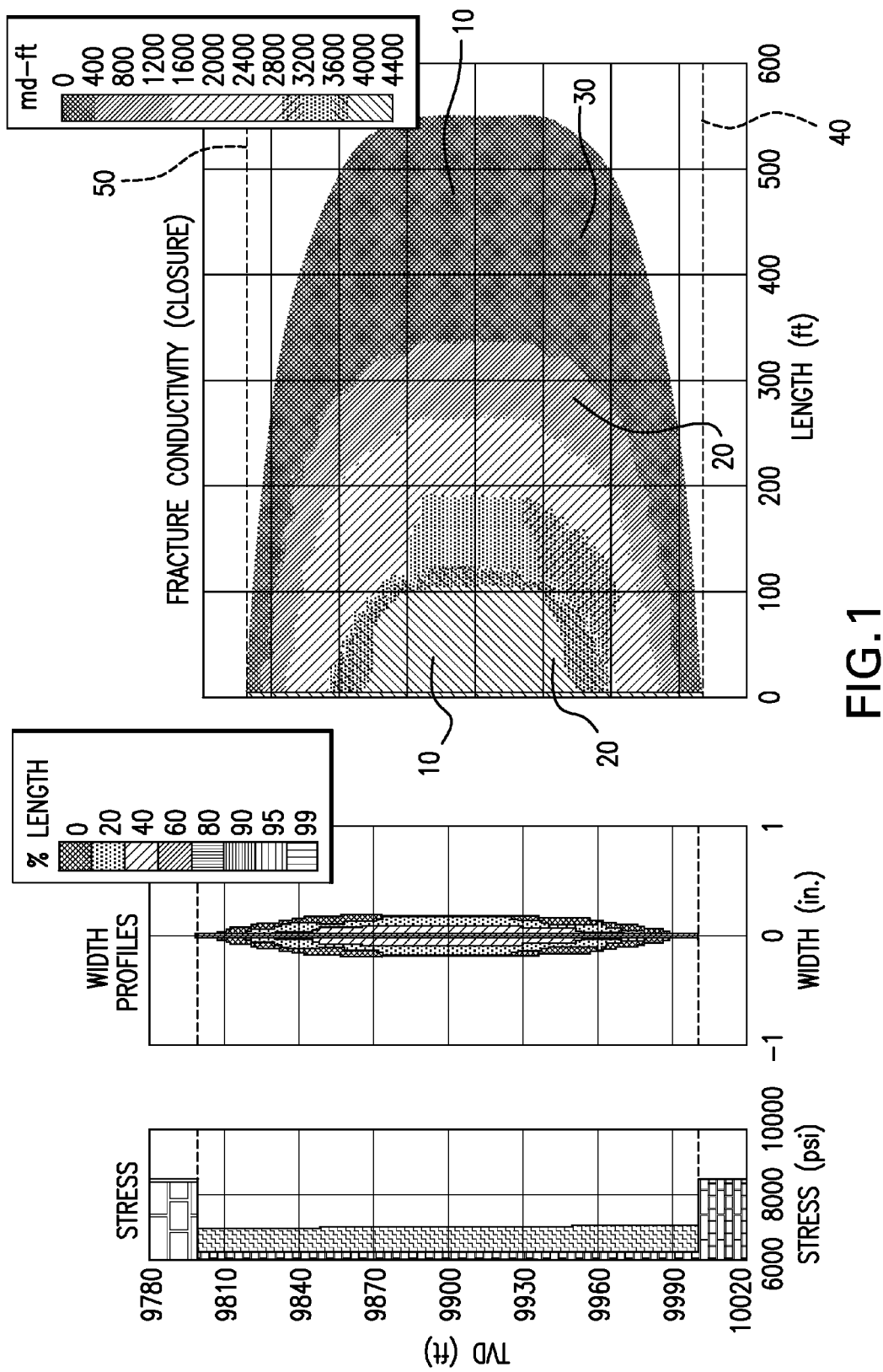
FIG. 1 is a 2D depiction of a fracture, after closure of the fracture, initiated with a fluid pad not containing a ULW proppant, the fracture being successively treated with a second proppant stage.

The method of fracturing a hydrocarbon-bearing subterranean formation, as defined by the invention, provides greater effective propped fracture length than seen with conventional fracturing techniques. Effective propped fracture lengths may be increased by as much as 100%. Such greater effective propped fracture length translates to improved stimulation efficiency, well productivity and reservoir drainage.

While not intending to be bound by any theory, it is believed that the enhanced effective length of the propped fracture is attributable to the reduced cross-sectional flow area existing above the settled bank. Where the first proppant stage is used to propagate the fracture, it is believed that the reduced cross-sectional flow area exists above the settled bank generated by this first proppant stage. Assuming constant pumping rates at the wellbore, the reduced cross-sectional area "artificially" increases the velocity of the second or successive proppant stages through that section of the fracture, leading to improved transport and deeper placement of the second or successive proppant stages into the fracture than would be achieved within the created fracture in the absence of the proppant bank.

In a preferred embodiment, the method of the invention consists of fracturing by introducing into the formation the use of multiple proppant stages wherein at least one of the proppant stages contains a ULW density proppant. Alternatively, the method consists of using a single proppant stage containing at least two proppants, wherein at least one of the proppant stages contains a ULW density proppant. As defined herein, a ULW proppant is one which has a density less than or equal to 2.45 g/cc.

The formation may first be propagated by introducing into the formation a proppant stage at a pressure sufficient to propagate the fracture. This proppant stage, which initiates the fracture, typically contains a conventional high-density proppant, though it may contain, in addition to or in lieu of the conventional high-density proppant, a ULW proppant.

The "first proppant stage" of the invention may refer to either the proppant stage introduced into the formation to propagate the fracture or a proppant stage introduced into the formation after propagation has occurred. Thus, the term "first proppant stage" is not to be construed as encompassing only the first proppant stage introduced to the fracture or formation. It is meant only to refer to a proppant stage which precedes a "second proppant stage."

The "first proppant stage" may contain a mixture of proppants, at least one of which is a ULW proppant. In a preferred mode, the first proppant stage contains at least two proppants. In a more preferred mode, the density differential of the two proppants in this mixture is greater than or equal to 0.2 g/cc. Where more than two proppants are present in the mixture, the density differential between at least two of the proppants in the mixture is greater than or equal to 0.2 g/cc. In another preferred mode, at least two proppants of the first proppant stage are ULW proppants. Depending on the operator, where the first proppant stage contains a mixture of such proppants, it may be desirous to introduce a second proppant stage into the formation after the introduction of the first proppant stage.

If the first proppant stage contains either a single proppant (either conventional high-density or ULW proppant) or a mixture of proppants, none of which are a ULW proppant, it is typically necessary to introduce a subsequent proppant stage into the formation. (As used herein, the term "conventional high-density proppant" refers to a proppant having a density greater than 2.45 g/cc.) This successive proppant stage is referred to herein as the "second proppant stage". It may be introduced into the formation immediately after the first proppant stage. Alternatively, at least one additional proppant stage may be introduced into the formation after the first proppant stage but before the second proppant stage.

Where a second proppant stage is employed, it is preferred that at least one of the following conditions should further prevail:

(i.) the first proppant stage and/or second proppant stage contains a mixture of proppants, at least one of which is a ULW proppant and, preferably wherein the density differential between at least two of the proppants in the mixture is greater than or equal to 0.2 g/cc;

(ii.) the first proppant stage and/or the second proppant stage contains a ULW proppant and the density differential between the first proppant stage and the second proppant stage is greater than or equal to 0.2 g/cc, preferably greater than or equal to 0.50 g/cc, most preferably greater than or equal to 0.80 g/cc. Preferably, the density of the second proppant stage is less than the density of the first proppant stage. For instance, the density of the proppant of the first proppant stage may be around 2.65 and the density of the proppant of the second proppant stage may be 1.90;

(iii.) both the first proppant stage and the second proppant stage contain ULW proppants;

(iv.) the proppant of the first proppant stage and/or the second proppant stage contain a ULW proppant and the rate of injection of the second proppant stage into the fracture is different from the rate of injection of the first proppant stage. Typically, the rate of injection of the second proppant stage is lower than the rate of injection of the first proppant stage. Typically the rate of injection of each of the proppant stages is greater than or equal to 5 barrels per minute. The rate of injection of any given proppant stage may be as high as 250 barrels/minute; or (v.) the proppant of the first proppant stage and/or second proppant stage contain a ULW proppant and the particle size of the second proppant stage is different from the particle size of the first proppant stage; typically, the particle size of the proppant of the second proppant stage is greater than the particle size of the proppant of the first proppant stage, especially where the second proppant stage is directed more towards the wellbore and smaller than the particle size of the proppant of the first proppant stage especially where the second proppant stage is directed further into the fracture. Typically, the particle size of the proppant with the proppant system used in the invention is from about 8/12 US mesh to about 100 US mesh. Most typically, the particle size of the proppant with the proppant system used in the invention is from about 12/20 US mesh to about 40/70 US mesh.

Successive proppant stages may be injected into the fracture after injection of the second proppant stage. Thus, the invention may consist of multiple proppant introductions provided at least one of the following conditions prevail:

(i.) the differential in density between the ultimate (successive) proppant stage and the penultimate proppant stage is greater than or equal to 0.2 g/cc;

(ii.) the rate of injection of the ultimate proppant stage into the fracture is different from the rate of injection of the penultimate proppant stage; typically, the rate of injection of the ultimate proppant stage into the fracture is lower than the rate of injection of the penultimate proppant stage into the fracture; or (iii.) the particle size of the ultimate proppant stage is different from the particle size of the penultimate proppant stage.

The limitation to the number of stages employed is principally based upon practicality from an operational perspective.

The effective propped length of the fracture after injection of the ultimate proppant stage is preferably greater than the effective propped length of the penultimate proppant stage.

In a preferred embodiment, the first proppant stage comprises a mixture of a first proppant and a second proppant, wherein the first proppant is a conventional high-density proppant, such as sand, ceramic, sintered bauxite or resin coated proppant, and the second proppant is a ULW proppant having a density less than or equal to 2.45 g/cc.

In another preferred embodiment, the process of the invention requires at least two proppant stages wherein the density differential between the first proppant stage and the second proppant stage is at least 0.2 g/cc. While the second proppant stage in such instances will require at least one ULW, the first proppant stage may contain either a conventional high-density proppant or a ULW.

Thus, for instance, the first proppant stage may be a banking fluid used to cause the initial propagation of the formation, allowing it to form a proppant bank. The banking fluid may contain a conventional high-density proppant. A subsequent second proppant stage may include a ULW proppant, exhibiting a particle density substantially lower than the density of the conventional high-density proppant. For instance, the proppant of the subsequent proppant stage may have a density ranging between from about 1.25 g/cc to about 1.75 g/cc.

Proppant stages containing ULW proppants are less subject to settling than conventional proppant stages and are more easily transported to provide greater effective propped fracture length.

In addition, the method of the invention offers a reduction in costs and the potential for significantly improved effective propped fracture length.

As an example of the process of the invention, a hydrocarbon-bearing subterranean formation may be hydraulically fractured by first introducing into the formation a first proppant stage. This first proppant stage may be a first fracturing fluid and may be introduced at a pressure sufficient to initiate a fracture. Alternatively, this first proppant stage may be introduced into the fracture after the fracture has been propagated. This initial (first) proppant stage may then be followed by fracturing the subterranean formation with a subsequent fracturing fluid, or second proppant stage. The number of successive proppant stages introduced into the fracture is determined by the preferences of the operator.

In a preferred embodiment of the invention, the fracturing fluid or "pad fluid" used to initiate the fracture may contain at least one ULW proppant. Fracture conductivity is greatly improved by the incorporation of small amounts of a ULW proppant in the pad fluid. The effective propped length of a fracture pumped with a ULW proppant-containing pad stage is greater than the effective propped fracture length of a fracture pumped with a substantially similar pad fluid not containing a ULW proppant. By "substantially similar pad fluid" is principally meant a pad fluid identical to the ULW proppant-containing pad stage but not containing the ULW proppant.

Typically, the amount of ULW proppant in the pad fluid is between from about 0.12 to about 24, preferably between from about 0.6 to about 9.0, weight percent based on the total weight percent of the fracturing fluid. The proppant in the second proppant stage (following the pad stage) contains either a ULW proppant or a conventional high density proppant. The concentration of the ULW or conventional high density proppant in the second proppant stage is typically greater than or equal to the concentration of ULW proppant in the pad fluid. Preferably, the density differential between the proppant of the first proppant stage (pad fluid) and the second proppant stage is at least 0.2 g/cc.

The fracturing fluid may include any conventional fluid treatment such as crosslinked organoborate gels, guar or cellulosic based slickwaters, brines, linear gels and foams. The fracturing fluid may further contain a fine particulate, such as sand, for fluid loss control, etc.

In a preferred embodiment, the initial (first) fracturing fluid may contain a breaker. Further preferable, however, is the use of slick fluids, such as those exhibiting reduced water friction, as the initial stage which do not require a breaking fluid. Other proppant stages may optionally contain a breaker. The breaker can be any conventionally employed in the art to reduce the viscosity of the fracturing fluid including, but not being restricted to, thermostable polymers. Depending on the application, a breaker of predictable performance may be incorporated into the initial fracturing fluid or any of the proppant stages referred to herein for downhole activation.

A "spearhead" fluid may further precede the introduction of the fracturing or pad fluid to clean-up undesired products, such as ferrous sulfide and/or ferric oxide. Such fluids are typically introduced into the reservoir at fracturing rates and pressures which initiate the fracture in the formation and contain components known in the art.

The initial fracturing fluid, as well as any of the proppant stages referred to herein, may also contain other conventional additives common to the well service industry such as surfactants, biocides, gelling agents, cross-linking agents, curable resins, hardening agents, solvents, foaming agents, demulsifiers, buffers, clay stabilizers, acids, or mixtures thereof. In the practice of the invention, the fracturing fluid may be any carrier fluid suitable for transporting a mixture of proppant into a formation fracture in a subterranean well. Such fluids include, but are not limited to, carrier fluids comprising salt water, fresh water, liquid hydrocarbons, and/or nitrogen or other gases.

The initial fracturing fluid of the invention is pumped at a rate sufficient to initiate and propagate a fracture in the formation and to place the proppant into the fracture and form a bank. During the actual pumping the pH may be adjusted by the addition of a buffer, followed by the addition of the enzyme breaker, crosslinking agent, proppant or additional proppant and other additives if required. After deposition, the proppant material serves to hold the fracture open, thereby enhancing the ability of fluids to migrate from the formation to the wellbore through the fracture.

Typically, viscous gels or foams are employed as the fracturing fluid in order to provide a medium that will adequately suspend and transport the solid proppant, as well as to impair loss of fracture fluid to the formation during treatment (commonly referred to as "filterability" or "fluid loss"). As such, viscosity of the fracturing fluid may affect fracture geometry because fluid loss affects the efficiency of a treatment. For example, when the rate of fluid loss to the formation equals or exceeds the rate of injection or introduction of fluid into a fracture, the fracture stops growing. Conversely, when the rate of fluid loss is less than the injection or introduction rate, taken together with other factors, a fracture continues to propagate. Excessive fluid loss thus results in fractures that are smaller and shorter than desired.

In one embodiment, the proppants disclosed herein may be introduced or pumped into a well as, for example, a saturated sodium chloride solution carrier fluid or a carrier fluid that is any other completion or workover brine having, for example, a specific gravity of from about 1 to about 1.5, alternatively from about 1.2 to about 1.5, further alternatively about 1.2, at temperatures up to about 150° F. and pressures up to about 1500 psi. However, these ranges of temperature and closure stress are exemplary only, it being understood that the materials may be employed as proppant materials at temperatures greater than about 150° F. and/or at closure stresses greater than about 1500 psi. It also being understood that core and/or layer materials may be selected by those of skill in the art to meet and withstand anticipated downhole conditions of a given application.

Preferably, the successive proppant stages (those proppant stages subsequent to the initial fracture proppant stage) include carrier systems that are gelled, non-gelled, or that have a reduced or lighter gelling requirement as compared to carrier fluids employed with conventional fracture treatment methods.

Conventional high-density proppants may be used in the first proppant stage, especially where the first proppant stage is used as the initial fracturing fluid, as well as in successive proppant stages (after the initial fracturing stage), may be any conventional proppant in the art. Such proppants include, for instance, quartz, glass, aluminum pellets, silica (sand) (such as Ottawa, Brady or Colorado Sands), synthetic organic particles such as nylon pellets, ceramics (including aluminosilicates such as "CARBOLITE," "NAPLITE" or "ECONOPROP"), sintered bauxite, and mixtures thereof. In addition, protective and/or hardening coatings, such as resins to modify or customize the density of a selected base proppant, e.g., ground walnut hulls, etc., resin-coated sand (such as "ACME BORDEN PR 6000" or "SANTROL TEMPERED HS"), resin-coated ceramic particles and resin-coated sintered bauxite may be employed.

Preferred high-density proppants are sand, ceramic, sintered bauxite and resin coated proppant. Such proppants typically exhibit a high density, for instance greater than 2.65 g/cc. Typically, sand or synthetic fracture proppants are used. Such proppants are normally used in concentrations between about 1 to 18 pounds per gallon of fracturing fluid composition, but higher or lower concentrations can be used as required.

The ULW proppant is defined as having a density less than or equal to 2.45 g/cc. Generally, the density of the ULW proppant is less than or equal to 2.25, more preferably less than or equal to 2.0, even more preferably less than or equal to 1.75, most preferably less than or equal to 1.25 g/cc. Such proppants are less subject to settling and can be more easily transported to provide greater effective propped fracture length. Greater effective propped fracture length translates to improved stimulation efficiency, well productivity and, reservoir drainage.

In a preferred embodiment, the second proppant stage contains a proppant having a density less than the density of the proppant in the first proppant stage. In a preferred embodiment, successive third proppant stages contain a proppant having a density less than the density of the proppant of the second proppant stage. Preferably, the density differential between the proppant of the third proppant stage and the proppant of the second stage is greater than or equal to 0.2 g/cc. Thus, in a preferred embodiment of the invention, two or more proppants are pumped in successive stages; each successive stage utilizing a proppant of lower density.

Such ULW proppants may be represented by relatively lightweight or substantially neutrally buoyant materials. One of the benefits of using such materials is that the requirements for the mixing equipment are minimized. For instance, when the carrier fluid is a brine, the only requirements on the mixing equipment is that it be capable of (a) mixing the brine (dissolving soluble salts), and (b) homogeneously dispersing in the substantially neutrally buoyant particulate material.

By "relatively lightweight" it is meant that the material has a density that is substantially less than a conventional proppant employed in hydraulic fracturing operations, e.g., sand or having a density similar to these materials. By "substantially neutrally buoyant", it is meant that a material having a density sufficiently close to the density of an ungelled or weakly gelled carrier fluid (e.g., ungelled or weakly gelled completion brine, other aqueous-based fluid, or other suitable fluid) to allow pumping and satisfactory placement of the proppant using the selected carrier fluid. For example, urethane resin-coated ground walnut hulls having a specific gravity of from about 1.25 to about 1.35 grams/cubic centimeter may be employed as a substantially neutrally buoyant proppant in completion brine having a density of about 1.2. It will be understood that these values are exemplary only. As used herein, a "weakly gelled" carrier fluid is a carrier fluid having minimum sufficient polymer, viscosifier or friction reducer to achieve friction reduction when pumped down hole (e.g., when pumped down tubing, work string, casing, coiled tubing, drill pipe, etc.), and/or may be characterized as having a polymer or viscosifier concentration of from greater than 0 pounds of polymer per thousand gallons of base fluid to about 10 pounds of polymer per thousand gallons of base fluid, and/or as having a viscosity of from about 1 to about 10 centipoises. An ungelled carrier fluid may be characterized as containing about 0 pounds per thousand gallons of polymer per thousand gallons of base fluid. Such relatively lightweight and/or substantially neutrally buoyant materials are disclosed in U.S. Pat. No. 6,364,018, herein incorporated by reference. Exemplary of such relatively lightweight and/or substantially neutrally buoyant fracture proppant material is a ground or crushed walnut shell material that is coated with a resin to substantially protect and water proof the shell. Such a material may have a specific gravity of from about 1.25 to about 1.35, and a bulk density of about 0.67.

Examples of types of materials suitable for use as relatively lightweight and/or substantially neutrally buoyant proppant materials include, but are not limited to, ground or crushed shells of nuts such as walnut, pecan, almond, ivory nut, brazil nut, etc.; ground or crushed seed shells (including fruit pits) of seeds of fruits such as plum, peach, cherry, apricot, etc.; ground or crushed seed shells of other plants such as maize (e.g. corn cobs or corn kernels), etc., crushed fruit pits or processed wood materials such as those derived from woods such as oak, hickory, walnut, poplar, mahogany, etc. including such woods that have been processed by grinding, chipping, or other form of particleization. Additional information on such materials and methods for use thereof may be found in U.S. Pat. No. 6,330,916 and in U.S. Pat. No. 6,059,034, herein incorporated by reference.

Those of skill in the art will understand that selection of suitable proppant will depend, in part, on the density of the carrier fluid and on whether it is desired that the selected proppant particle be relatively lightweight or substantially neutrally buoyant in the selected carrier fluid, and/or whether or not it is desired that the carrier fluid be non-gelled or non-viscosified.

The ULW proppants employed in the invention, including the relatively lightweight and/or substantially non-buoyant proppants, may be chipped, ground, crushed, or otherwise processed to produce particulate material having any particle size or particle shape suitable for use in the methods disclosed herein. Typically, the particle sizes of the proppants employed in the invention range from about 4 mesh to about 100 mesh, alternatively from about 8 mesh to about 60 mesh, alternatively from about 12 mesh to about 50 mesh, alternatively from about 16 mesh to about 40 mesh, and alternatively about 20 to 40 mesh. In one exemplary case, the proppant may ground walnut shells having a particle size of about 12/20 US mesh size in the first proppant stage and 20/40 US mesh size in the second proppant stage.

In a preferred mode, the second proppant stage is introduced into the formation immediately after the first proppant stage and the third proppant stages is introduced into the formation immediately after the second proppant stage without any intervening proppant stages.

Further, in a preferred mode, where the injection rate of a successive proppant stage is identical to the injection rate of the proppant stage introduced into the fracture immediately before the successive proppant stage or where the density of the proppant of the successive proppant stage is identical or less than the density of the proppant of the proppant stage introduced into the fracture immediately before the successive proppant stage, the particle size of the proppant of the successive proppant stage is different from the particle size of the proppant of the proppant stage introduced into the fracture immediately before the successive proppant stage.

Fracture proppant sizes may be any size suitable for use in a fracturing treatment of a subterranean formation. It is believed that the optimal size of the proppant material may be dependent, among other things, on the size of the fracture, on in situ closure stress. As an example of the variance of the particle size in the invention, the particle size of the proppant of the first (initial) proppant stage may be 40 mesh while the particle size of the proppant of the second proppant size may be 30 mesh.

It is possible further that the particle size of the proppant between successive fractures may differ due to the coatings on the proppants. For instance, a proppant of a second proppant stage may be selected from at least one of ground or crushed nut shells, ground or crushed seed shells, ground or crushed fruit pits, processed wood, or a mixture thereof. A proppant of a first proppant stage may additionally include at least a portion of the individual particles of the particulate material above as core component which is at least partially surrounded by at least one layer component of the second proppant, the first proppant including a protective or hardening coating. Under such circumstances, if the core of the first proppant is identical to the core of the second proppant, the first proppant would have a greater particle size.

The potential for significantly improved effective propped fracture length is evidenced by use of the method of the invention. This may be due to the reduced cross-sectional flow area existing above the settled bank generated by the first proppant pumped. Assuming constant pumping rates at the wellbore, the reduced cross-sectional area 'artificially' increases the successive reduced density proppant slurry velocities through that section of the fracture, leading to improved transport and deeper placement of those slurry stages into the fracture than would be achieved within the created fracture in the absence of the proppant bank.

Under some circumstances deformable particles having a size substantially equivalent or larger than a selected fracture proppant size may be employed. Such deformable particles are discussed above. For example, a deformable particulate material having a larger size than the fracture proppant material may be desirable at a closure stress of about 1000 psi or less, while a deformable particulate material equal in size to the fracture proppant material may be desirable at a closure stress of about 5000 psi or greater. However, it will be understood with benefit of this disclosure that these are just optional guidelines. In one embodiment, a deformable particle is selected to be at least as big as the smallest size of fracture proppant being used, and may be equivalent to the largest fracture proppant grain sizes. In either case, all things being equal, it is believed that larger fracture proppant and deformable particulate material is generally advantageous, but not necessary. Although deformable particulate material smaller than the fractured proppant may be employed, in some cases it may tend to become wedged or lodged in the fracture pack interstitial spaces. In one embodiment, deformable particles used in the disclosed method may have a beaded shape and a size of from about 4 mesh to about 100 mesh, alternatively from about 8 mesh to about 60 mesh, alternatively from about 12 mesh to about 50 mesh, alternatively from about 16 mesh to about 40 mesh, and alternatively about 20/40 mesh. Thus, in one embodiment, deformable particles may range in size from about 1 or 2 mm to about 0.1 mm; alternatively their size will be from about 0.2 mm to about 0.8 mm, alternatively from about 0.4 mm to about 0.6 mm, and alternatively about 0.6 mm. However, sizes greater than about 2 mm and less than about 0.1 mm are possible as well.

Deformable particles may be mixed and pumped with fracture proppant material throughout or during any portion of a hydraulic fracturing treatment in the practice of the disclosed method. However, in one embodiment when deformable particulate material is mixed with only a portion of a fracture proppant material pumped into a formation, it may be mixed with proppant during the latter stages of the treatment in order to dispose the deformable particulate material in the fracture pack at or near the point where the wellbore penetrates a subterranean formation.

Deformable particles having any density suitable for fracturing a subterranean formation may be employed in the practice of the disclosed method. In one embodiment specific gravity of deformable particulate material may range from about 0.3 to about 12, alternatively from about 0.4 to about 12, and further alternatively from about 0.5 to about 12. In another embodiment, the specific gravity of a deformable particulate material is from about 0.3 to about 3.5, alternatively from 0.4 to about 3.5, alternatively from about 0.5 to about 3.5, alternatively from about 0.6 to about 3.5, and even alternatively from about 0.8 to about 3.5. Alternatively a deformable particulate material having a specific gravity of from about 1.0 to about 1.8 is employed, and alternatively a deformable particle having a specific gravity of about 1.0 to about 1.1 is employed. In another specific embodiment, a particular divinylbenzene crosslinked polystyrene particle may have a bulk density of from about 0.4 to about 0.65, and alternatively of about 0.6. In another specific exemplary embodiment, a particular divinylbenzene crosslinked polystyrene particle may have a specific gravity of about 1.055. However, other specific gravities are possible. Advantageously, in one embodiment when deformable particles having a density less than that of a selected fracture proppant material are employed, reduced treating pressures and concentration levels of potentially formation-damaging gelled or viscous fluids may be employed. This may allow higher treating rates and/or result in higher formation productivity.

Lastly, in a preferred mode, the second or ultimate proppant stage is injected into the fracture at a rate different from the injection rate of the first or penultimate proppant stage. Preferably, the rate of injection of the ultimate proppant stage is less than the rate of injection of the penultimate proppant stage. Typically, the rate of injection of a proppant stage into the formation or fracture in accordance with the invention is from about 5 barrels per minute to as high as 270 barrels per minute. Generally, the rate of injection is no greater than about 150 barrels per minute.

Additionally, the same arguments for this approach would apply when using more viscous fluids such as linear or crosslinked fluids, particularly when considering applications in more rigorous downhole environments (i.e., higher temperatures).

Further, subsequent to creating the fracture, it may be advantageous to reverse the process and fracture back to the wellbore filling the wellbore. This can be achieved in sequential steps such that at least one of the following conditions prevails after each successive stage:

(1) the density of the successive (ultimate) stage being injected into the wellbore is generally less than the density of the stage introduced to the wellbore just prior (penultimate) to the successive stage;

(2) the rate of injection of the ultimate stage being injected into the fracture is less than the rate of injection of the penultimate stage; or (3) the particle size of the proppant of the ultimate stage being injected into the fracture is different than the particle size of the proppant of the penultimate stage.

The following examples will illustrate the practice of the present invention in its preferred embodiments. Other embodiments within the scope of the claims herein will be apparent to one skilled in the art from consideration of the specification and practice of the invention as disclosed herein. It is intended that the specification, together with the examples, be considered exemplary only, with the scope and spirit of the invention being indicated by the claims that follow.

EXAMPLES

Example 1 (Comparative)

This Example Demonstrates the Settling Rates for Ottawa Sand And Walnut Hull ULW ULW 1.75 is porous ceramic material from Carbo Ceramics, Inc. treated with 2% by weight of particle epoxy inner coating/penetrating material (epoxy is reaction product of epichlorohydrin and bis-phenol A) and with 2% by weight of particle phenol formaldehyde resin outer coating material. It can be characterized as a porous ceramic particle with the roundness and sphericity common to ceramic proppants. The porosity averages 50%, yielding a bulk density of 1.10 to 1.15 g/cm$^3$. Median-sized 20/40 particles of the ULW-1.75 and Ottawa sand were used. The 20/40 Ottawa sand has an average bulk density of 1.62 g/cm$^3$ with a specific gravity of 2.65. The ULW-1.75 has a bulk density of 1.05 to 1.10.

Static particle settling evaluations were conducted in fresh water to determine the differences in settling rate between the conventional proppant and the ULW particles. Median sized 20/40 particles of each proppant were used for the evaluations. Stokes Law calculations giving the fall velocity in ft/minute are presented in Table 1 and were calculated as:

$$V = 1.15 \times 10^3 (d^2_{prop} \mu_{fluid})(Sp.Gr._{prop} - Sp.Gr._{fluid})$$

where velocity is in ft/min., diameter d is the average particle diameter and, $\mu$ is fluid viscosity in cps.

TABLE 1

Static Settling Rates for Proppants as Derived by Stoke's Law

| 20/40 Proppant | Sp. Gr. | Settling Velocity ft/minute |
|---|---|---|
| Ottawa sand | 2.65 | 16.6 |
| ULW-1.75 | 1.75 | 11.2 |

Large-scale slot flow tests were conducted to characterize the dynamic settling rates of the ultra-lightweight proppant. Proppant transport characteristics were studied at ambient temperature through a glass slot. The transparent slot is a 22-inch high, 16-ft long and 0.5-inch wide parallel plate device. One thousand gallons of test fluid was prepared and the fluid rheology was measured using a standard Fann 35 viscometer. Fluid was then transferred to a 200-gallon capacity ribbon blender and pumped through the test loop to fill the transparent slot model. Once the slot was filled with the test fluid, proppant was added to the blender to prepare a slurry of the desired concentration. The slickwater fluid used in the test exhibited an average viscosity of 5 to 7 cps throughout the series of tests.

The shear rate in the slot is given by the equation:

$$\gamma = [\sec^{-1}] = \frac{1.925\, q[\text{gpm}]}{(w[\text{in.}])^2 (H[\text{ft}])}$$

where q is the rate in gallons per minute, w is width in inches and H is height in feet. Fluid velocity through this slot model is given by:

$$v[\text{m/sec}] = \frac{0.00815\, q[\text{gpm}]}{(w[\text{in.}])(H[\text{ft}])}$$

The proppant transport behavior of each test slurry was observed through the slot at various flow rates. During these tests, the proppant distribution was continually recorded with video cameras as well as manually by observation. All bed height measurements for this work were taken close to the discharge end of the slot flow cell.

Ottawa sand slurried in slickwater was observed to begin settling upon entrance to the slot even at the maximum fluid pump rate. Within 12 minutes at 90 gpm (378 sec−1 shear rate), the bed height was 15 inches, 68% of the total height of the 22 in. slot. Table 2 below shows the results in tabular form. Only at shear rates in excess of 1000 sec−1 was the dynamic Ottawa Sand proppant fall rate mitigated in the slickwater test fluid. As flow rates were lowered to 30 gpm, the Ottawa proppant bed reached its maximum bed height of 19.5 inches or 91.25% of the slot height. Above the proppant bed, the shear rate reached 1,414 sec−1, at which point additional settling did not occur. As the rate increased from 30 to 40 gpm (1,919 sec−1), the bed height was actually reduced.

TABLE 2

| Time, minute | Fluid Rate Gpm | Prop Bed Height (ft) | Slot Shear Sec−1 | Above bed, sec−1 |
|---|---|---|---|---|
| 0 | 90 | 0 | 378 | 378 |
| 1 | 90 | 0.25 | 383 | 443 |
| 12 | 90 | 1.25 | 381 | 1201 |
| 14 | 60 | 1.27 | 252 | 825 |
| 18 | 60 | 1.38 | 252 | 825 |
| 19 | 40 | 1.39 | 168 | 677 |
| 28 | 40 | 1.54 | 170 | 1076 |
| 30 | 30 | 1.58 | 116 | 858 |
| 42 | 30 | 1.67 | 171 | 1414 |
| 43 | 40 | 1.67 | 171 | 1919 |
| 45 | 40 | 1.52 | 169 | 1070 |

The ULW-1.75 test was initiated at 90 gpm. ULW-1.75 was observed to be subject to some settling at 90 gpm, with the bed height growing to 4 inches. The fluid rate was lowered to 80 gpm and bed height grew to 6 inches. As the rates were reduced incrementally down to 30 gpm, the ULW-1.75 bed was observed to grow with reduced rate to 12 inches. The rate was lowered further to 5 gpm and the bed height grew to 19 inches or 86% of the total slot height. As observed in previous tests, as the rate is increased incrementally, bed height decreases due to erosion and fluidization of the bed. The ULW-1.75 results are presented in Table 3.

TABLE 3

| Time, minute | Fluid Rate Gpm | Prop Bed Height | Slot Shear Sec−1 | Above bed, sec−1 |
|---|---|---|---|---|
| 0 | 90 | 0.0 | 378 | 378 |
| 7 | 90 | 0.33 | 378 | 463 |
| 8 | 80 | 0.38 | 337 | 423 |
| 11 | 80 | 0.54 | 337 | 478 |
| 12 | 70 | 0.58 | 295 | 432 |
| 15 | 60 | 0.71 | 252 | 412 |
| 17 | 60 | 0.79 | 252 | 445 |
| 18 | 50 | 0.83 | 210 | 386 |
| 20 | 50.4 | 0.92 | 212 | 425 |
| 22 | 39 | 0.96 | 164 | 345 |
| 23 | 30 | 1 | 126 | 278 |
| 28 | 31 | 1.29 | 130 | 443 |
| 29 | 20 | 1.33 | 81 | 299 |
| 33 | 8 | 1.44 | 34 | 159 |
| 34 | 5.1 | 1.46 | 21 | 106 |
| 35 | 20 | 1.54 | 84 | 534 |
| 37 | 20.5 | 1.58 | 86 | 640 |
| 38 | 40.4 | 1.52 | 170 | 1006 |
| 40 | 50.6 | 1.46 | 213 | 1048 |
| 45 | 60.2 | 1.33 | 253 | 933 |

Both of the tested materials settle progressively more as the velocity decreases. Due to the decreased density, the ULW is more easily placed back in flow as the rate is increased. The reduced density materials require less shear increase to fluidize the proppant bed. Ottawa sand was observed to require in excess of 1,500 sec−1 to transport the proppant in slickwater and almost 2,000 sec−1 of shear to begin to fluidize the proppant bed. The ULW-1.75 transporting at shear rates of 500 sec−1 and fluid shear rates of 800 sec−1 were needed to fluidize the proppant bed.

Example 2

This Example Illustrates Use of the Combination of Both Sand and Walnut Hull ULW Proppants One hundred pounds of sand and 50 pounds of walnut hull ULW proppant were blended together in a ribbon blender and circulated throughout the system. The blend displayed behavior almost identical to their individual tests, respectively. The sand settled even at very high flow rates, throughout the length of the slot as in the earlier test.

Because sand built bed height continuously throughout the test, the ULW proppant stayed suspended. Lateral velocity was increased by the sand bed, so very little ULW proppant was entrained in the sand bed. This is attributable to the fact that the sand bed height artificially increased lateral velocities in the slot to levels that maintained the ULW proppant in suspension for the most part. Most of the sand settled out in the slot before any ULW proppant began to settle. Rates had to be dropped down to below 10 gpm in order to initiate larger scale settling of the ULW material and by that time, there was little sand left to settle.

The process presents a suitable means to improve penetration of proppant into a productive horizon. Both proppants behave independently from each other, yet the settling of the heavier proppant improves the ability of the lighter proppant to move deeper in the fracture by partially occluding the open flow space. It is reasonable to assume that the behavior will extend to more than two proppants in a given slurry and as such may offer additional advantages in fracture placement and propagation. This offers advantages for slickwater fracturing operations as they are currently conducted.

Example 3

This Example Demonstrates the Improvement in Fracture Conductivity by Use of a ULW Proppant as a Component in a Pad Fluid A fracture was simulated using the Mfrac three-dimensional hydraulic fracturing simulator of Meyer & Associates, Inc. using a simple 3-layer isotropic homogeneous 0.1 mD permeability gas reservoir model, 40 acre spacing. The fracture was designed to be placed into the zone at a theoretical depth of 9800 feet and the model was run in full 3-D mode. The fracturing fluid was a crosslinked organoborate. The pad fluid was injected into the model at a rate of 50 barrels per minute (bpm). The fracturing fluid of Example 3A contained no ULW proppant. In Example 3B, a very small amount (0.5 pounds per gallon) of LiteProp™ 125 lightweight proppant, a product of BJ Services Company, was added to the fracturing fluid. The second and subsequent stages employed sand as proppant wherein the sand concentration was approximately 8 ppg. Since the Mfrac model does not make calculations for a partial monolayer, the conductivity of the proppant was artificially increased at a concentration of 0.5 lbs/sq. ft. Table 4 shows the pump schedule utilized for Example 3A and Table 5 shows the pump schedule for Example 3B.

TABLE 4

| Stage No. (—) | Slurry Rate (bpm) | Stage Liquid Volume (U.S. gal) | Stage Time (min) | Stage Type (—) | Fluid Type (—) | Prop Type (—) | Prop Conc. (lbm/gal) | Prop Damage Factor (—) |
|---|---|---|---|---|---|---|---|---|
| 1 | 50 | 20000 | 9.5238 | Pad | B095 | 0000 | 0 | 0 |
| 2 | 50 | 10000 | 5.1929 | Prop | B095 | 0001 | 2 | 0 |
| 3 | 50 | 10000 | 5.6239 | Prop | B095 | 0001 | 4 | 0 |
| 4 | 50 | 10000 | 6.0548 | Prop | B095 | 0001 | 6 | 0 |
| 5 | 50 | 10000 | 6.4858 | Prop | B095 | 0001 | 8 | 0 |
| 6 | 50 | 9600 | 4.5714 | Flush | SG20 | 0000 | 0 | 0 |

Wellbore Fluid Type: 2% KCl
B095 - Spectra Frac HT 3500 w/ 4.0 gpt BF-7L, 2.0 gpt XLW-56 crosslinker, products of BJ Services Company,
Fluid Type: SG20 - 2% KCl guar slickwater 20#
Proppant Type: 0000 - No Prop, Slug
Proppant Type: 0001 - 20/40 Jordan Sand

TABLE 5

| Stage No. (—) | Slurry Rate (bpm) | Stage Liquid Volume (U.S. gal) | Stage Time (min) | Stage Type (—) | Fluid Type (—) | Prop Type (—) | Prop Conc. (lbm/gal) | Prop Damage Factor (—) |
|---|---|---|---|---|---|---|---|---|
| 1 | 50 | 20000 | 9.9803 | Pad | B095 | SG19 | 0.5 | 0 |
| 2 | 50 | 10000 | 5.1929 | Prop | B095 | 0001 | 2 | 0 |
| 3 | 50 | 10000 | 5.6239 | Prop | B095 | 0001 | 4 | 0 |
| 4 | 50 | 10000 | 6.0548 | Prop | B095 | 0001 | 6 | 0 |
| 5 | 50 | 10000 | 6.4858 | Prop | B095 | 0001 | 8 | 0 |
| 6 | 50 | 9600 | 4.5714 | Flush | SG20 | 0000 | 0 | 0 |

Figure 2:
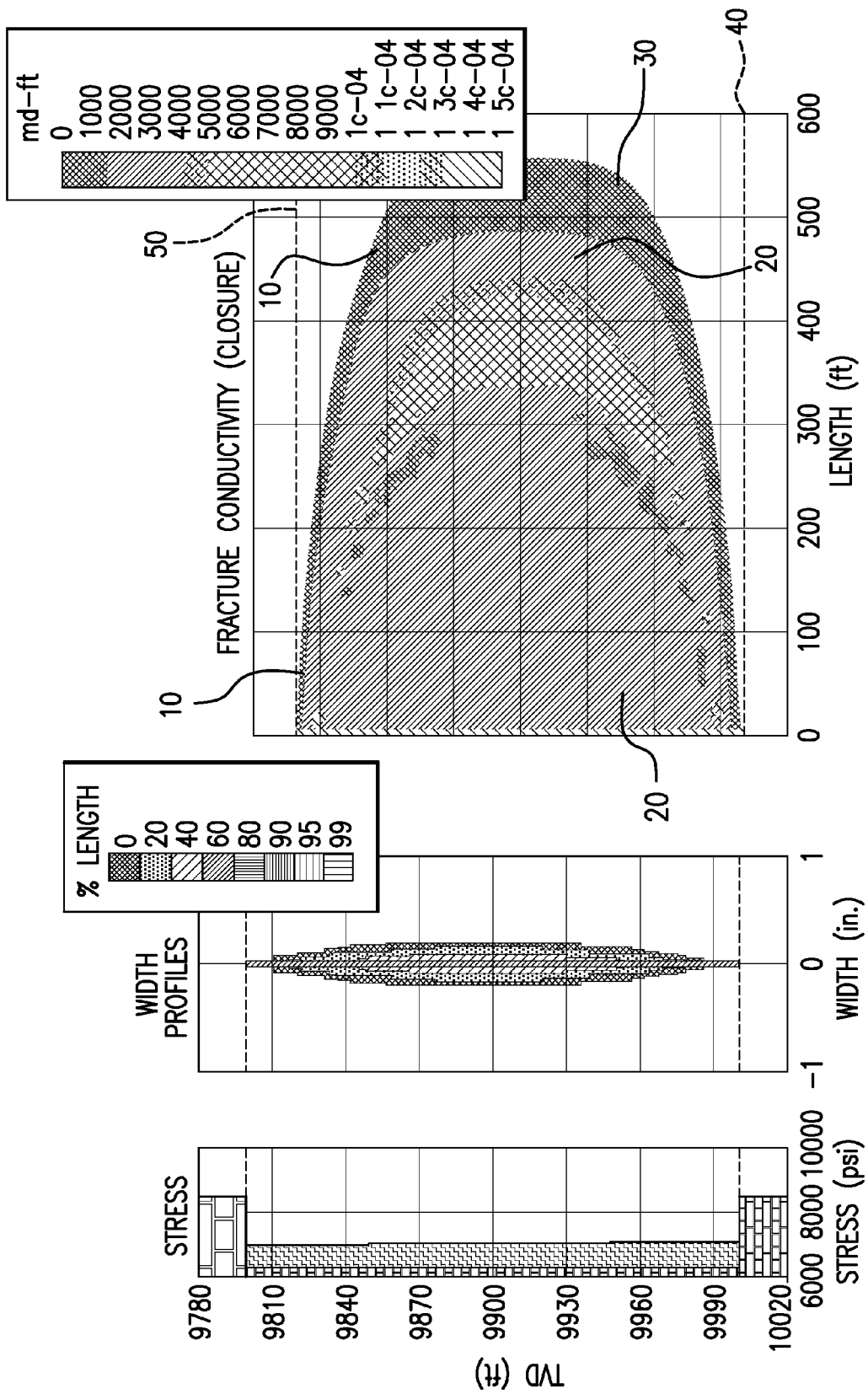
FIG. 2 is a 2D depiction of a fracture, after closure of the fracture, initiated with a fluid pad containing a ULW proppant, the fracture being successively treated with a second proppant stage.

Wellbore Fluid Type: 2% KCl
B095 - Spectra Frac HT 3500 w/ 4.0 gpt BF-7L, 2.0 gpt XLW-56 crosslinker, products of BJ Services Company,
Fluid Type: SG20 - 2% KCl guar slickwater 20#
Proppant Type: SG19 - ULW 125 partial monolayer Proppant
Proppant Type: 0001 - 20/40 Jordan Sand
Proppant Type: 0000 - No Prop, Slug Fracture conductivity between the proppant-packed fracture and that of the native reservoir, mathematically defined as:

(proppant pack permeability×fracture width)/(formation permeability×propped fracture half length)

is illustrated in the conductivity profiles of FIGS. 1 and 2 after closure of the fracture. FIG. 1 is a 2D depiction of the fracture of injection of the fracturing fluid of Example 3A. FIG. 2 contrasts injection of the fracturing fluid of Example 3B. In both figures, the "created fracture area," represented as 10, is the area of the reservoir traversed by the propagating fracturing fluid pad. The "propped fracture area", 20, is contributory to well stimulation, and represents the area of the reservoir "propped open" to provide improved fracture conductivity. The created but unpropped area 30, "heal" upon fracture closure and, thus, is not considered to be stimulated.

As set forth in FIGS. 1 and 2, the propped fracture length is increased from approximately 320 ft to approximately 460 feet by the addition of the ULW proppant and all of the proppant ends in the pay zone, defined by the area within 40 and 50. The Figures demonstrate greatly improved fracture conductivity by the incorporation of a ULW proppant into a previously non-proppant laden pad fluid. This results in an enhanced fracture length which leads to enhanced well productivity, producible well reserves and ultimate expected recovery. Use of the ULW proppants avoid failure due to settling and bridging of the particles.

The foregoing disclosure and description of the invention is illustrative and explanatory thereof, and various changes in the size, shape, and materials, as well as in the details of illustrative construction and assembly, may be made without departing from the spirit of the invention.

What is claimed is:

1. A method of fracturing a subterranean formation comprising:
   pumping into an initiated fracture in the formation a first proppant stage containing an ultra lightweight (ULW) proppant having a density less than or equal to 2.45 g/cc;
   pumping a fracturing fluid into the fracture; and
   pumping a second proppant stage into the fracture, the second proppant stage containing an ultra lightweight (ULW) proppant having a density less than or equal to 2.45 g/cc
   wherein the effective propped length of the fracture after pumping of the second proppant stage is greater than the effective propped length of the fracture prior to pumping of the second proppant stage; and
   further wherein at least one of the following conditions prevail:
   (i) the density differential between the second proppant stage and the first proppant stage is greater than or equal to 0.2 g/cc;
   (ii) the density of the ULW proppant of the first proppant stage is less than or equal to 2.0 g/cc;
   (iii) the ULW proppant of the first proppant stage and the ULW proppant of the second proppant stage is the same material;
   (iv) at least one of the first proppant stage or the second proppant stage contains slickwater; and
   (v) the particle size of the ULW proppant in the first proppant stage and the second proppant stage is between from about 8 mesh to about 100 mesh.

2. The method of claim 1, wherein the density differential between the second proppant stage and the first proppant stage is greater than or equal to 0.2 g/cc.

3. The method of claim 1, wherein the density of the ULW proppant of the first proppant stage is less than or equal to 2.0 g/cc.

4. The method of claim 3, wherein the density of the ULW proppant of the first proppant stage is less than or equal to 1.75 g/cc.

5. The method of claim 4, wherein the density of the ULW proppant of the first proppant stage is less than or equal to 1.25 g/cc.

6. The method of claim 1, wherein the ULW proppant of the first proppant stage and the ULW proppant of the second proppant stage is the same material.

7. The method of claim 1, wherein at least one of the first proppant stage or the second proppant stage contains slickwater.

8. The method of claim 1, wherein the particle size of the ULW proppant in the first proppant stage and the second proppant stage is between from about 8 mesh to about 100 mesh.

9. The method of claim 1, wherein the fracturing fluid contains a crosslinked organoborate gel, guar, cellulosic based slickwaters, brines, linear gels or a foam.

10. A method of stimulating a hydrocarbon-bearing subterranean formation which comprise pumping a penultimate proppant stage and an ultimate proppant stage into a fracture in the formation, wherein at least one of the following conditions prevail:
    (i.) at least one of the proppant stages contains a first proppant and a second proppant wherein at least one of the first or second proppant is a ULW proppant having a density less than or equal to 2.45 g/cc;

(ii.) the density differential between the penultimate proppant stage and the ultimate proppant stage is greater than or equal to 0.2 g/cc and either the penultimate proppant stage, the ultimate proppant stage or both the penultimate stage and the ultimate proppant stage contains a ULW proppant;

(iii.) both the penultimate proppant stage and the ultimate proppant stage contain ULW proppants;

(iv.) the penultimate proppant stage; the ultimate proppant stage; or both the penultimate proppant stage and the ultimate proppant stage contains a ULW proppant and the rate of injection of the ultimate proppant stage into the fracture is different from the rate of injection of the penultimate proppant stage; or (v.) the proppant of the penultimate proppant stage, the ultimate proppant stage or both the penultimate proppant stage and the ultimate proppant stage contains a ULW proppant and the particle size of the ultimate proppant stage is different from the particle size of the penultimate proppant stage; and further wherein a fracturing fluid is introduced into the fracture after the penultimate proppant stage but prior to the ultimate proppant stage.

11. The method of claim 10, wherein a partial monolayer of ULW proppant is formed in the fracture.

12. The method of claim 10, wherein the fracturing fluid contains a crosslinked organoborate gel, guar, cellulosic based slickwaters, brines, linear gels or a foam.

13. The method of claim 10, wherein the density of the ULW proppant of the penultimate proppant stage, the ultimate proppant stage or both the penultimate proppant stage and the ultimate proppant stage is less than or equal to 2.0 g/cc.

14. The method of claim 10, wherein the ULW proppant of the penultimate proppant stage, the ultimate proppant stage or both the penultimate proppant stage and the ultimate proppant stage is other than ground or crushed shells of nuts, ground or crushed seed shells of seeds of fruits, ground or crushed seen shells of plants, crushed fruit pits or processed wood materials.

15. The method of claim 11, further comprising introducing a pad fluid into the formation in order to initiate the fracture.

16. The method of claim 15, wherein at least one of the penultimate or ultimate proppant stages contains slickwater.

17. A method of stimulating a hydrocarbon-bearing subterranean formation which comprises:

pumping into an initiated fracture in the formation a first proppant stage containing an ultra lightweight (ULW) proppant having a density less than or equal to 2.45 g/cc; and pumping a second, penultimate and ultimate proppant stages into the fracture, the proppant of the second, penultimate and ultimate proppant stages containing an ultra lightweight (ULW) proppant having a density less than or equal to 2.45 g/cc wherein (i) the effective propped length of the fracture after pumping of the second proppant stage is greater than the effective propped length of the fracture prior to pumping of the second proppant stage; (ii) the effective propped length of the fracture after pumping of the penultimate proppant stage is greater than the effective propped length of the fracture prior to pumping the penultimate proppant stage; and (iii) the effective propped length of the fracture after pumping of the ultimate proppant stage is greater than the effective propped length of the fracture prior to pumping the ultimate proppant stage; and wherein at least one of the following conditions prevail:

(i) either the density differential between the second proppant stage and the first proppant stage is greater than or equal to 0.2 g/cc; or the density differential between the ultimate proppant stage and the penultimate proppant stage is greater than or equal to 0.2 g/cc; or both the density different between the second proppant stage and the first proppant stage is greater than or equal to 0.2 g/cc and the density differential between the ultimate proppant stage and the penultimate proppant stage is greater than or equal to 0.2 g/cc;

(ii) either the proppant of the first proppant stage and the proppant of the second proppant stage is the same material; the proppant of the penultimate proppant stage and the proppant of the ultimate proppant stage is the same material; or both the proppant of the first proppant stage and the proppant of the second proppant stage is the same material and the proppant of the penultimate proppant stage and the proppant of the ultimate proppant stage is the same material; and (iii) at least one of the first proppant stage, second proppant stage, penultimate proppant stage or ultimate proppant stage contains slickwater and further wherein a fracturing fluid is introduced into the formation between one or more of the following stages: the first proppant stage and the second proppant stage; the second proppant stage and the penultimate proppant stage; and the penultimate proppant stage and the ultimate proppant stage.

18. The method of claim 17, wherein the fracturing fluid contains a crosslinked organoborate gel, guar, cellulosic based slickwaters, brines, linear gels or foams.

19. The method of claim 17, wherein the density of the ULW proppant of the first proppant stage, second proppant stage, penultimate proppant stage and ultimate proppant stage is less than or equal to 2.0 g/cc.

20. The method of claim 17, wherein the ULW proppant of the first proppant stage, second proppant stage, penultimate proppant stage or ultimate proppant stage is other than ground or crushed shells of nuts, ground or crushed seed shells of seeds of fruits, ground or crushed seed shells of plants, crushed fruits pits or processed wood materials.

21. The method of claim 17, wherein a partial monolayer of the ULW proppant is created in the fracture.

22. The method of claim 17, wherein at least one of the first proppant stage, second proppant stage, penultimate proppant stage or ultimate proppant stage contains slickwater.

* * * * *

UNITED STATES PATENT AND TRADEMARK OFFICE
CERTIFICATE OF CORRECTION

| | | |
|---|---|---|
| PATENT NO. | : 8,127,850 B2 | |
| APPLICATION NO. | : 13/079636 | |
| DATED | : March 6, 2012 | |
| INVENTOR(S) | : Harold Dean Brannon et al. | |

It is certified that error appears in the above-identified patent and that said Letters Patent is hereby corrected as shown below:

Column 19, Claim 14, line 41 should read -crushed seed shells of plants, crushed fruit pits or processed-;

Signed and Sealed this
First Day of May, 2012

David J. Kappos
*Director of the United States Patent and Trademark Office*